United States Patent [19]
Hiroshima et al.

[11] 3,753,001
[45] Aug. 14, 1973

[54] ELECTRIC POWER SUPPLY SYSTEM USING BACK-UP CAPACITOR

[75] Inventors: Minoru Hiroshima, Fumiyuki Inose, Sadao Kobayashi, Takashiro Iwasaki, all of Tokyo; Shizuhisa Watanabe, Katsuta; Takahiko Tanigami, Mito, all of Japan

[73] Assignee: Nissan Motor Company, Limited, Kanagawa-ku, Yokohama City, Japan

[22] Filed: June 29, 1972

[21] Appl. No.: 267,359

[30] Foreign Application Priority Data
June 30, 1971 Japan.............................. 46/47231

[52] U.S. Cl................. 307/10 R, 307/64, 307/109, 307/146, 320/1, 323/8
[51] Int. Cl............................................. H02j 1/06
[58] Field of Search .................... 320/1; 307/64, 67, 307/71, 109, 146, 10 R; 321/15, 20, 47; 323/7, 8, 17

[56] References Cited
UNITED STATES PATENTS
2,759,138  8/1956  Andrews............................... 320/1
3,603,973  9/1971  Hough .............................. 307/66 X Primary Examiner—Gerald Goldberg
Attorney—John Lezdey et al.

[57] ABSTRACT

Herein disclosed is an improved d-c power supply system which comprises a d-c power source, a first rectifier serially connected to the power source, and series connection composed of a protective resistor and a back-up capacitor, the series connection being connected across the first rectifier and the power source, and the protective resistor being bypassed by a second rectifier so that a discharge current from the back-up capacitor flows through the second rectifier. The power supply system further comprises means for producing information signals representing condition of the back-up capacitor.

2 Claims, 3 Drawing Figures

3,753,001

ELECTRIC POWER SUPPLY SYSTEM USING BACK-UP CAPACITOR

The present invention relates to electric power supply systems and, more particularly, to a d-c electric power supply system using a back-up capacitor The specific purpose of the invention is to provide a simple, safe and reliable d-c electric power supply system that can supply a d-c electric power or energy to a load without unwanted energy loss or voltage drop. The load to be connected to the power supply system may be a safety device for a motor vehicle such as the air-bag system.

Generally the system of the invention includes a d-c power source for producing a d-c energy, storing means for storing therein the d-c energy, and output means for delivering the d-c energy from the d-c power source and the stored d-c energy to a load element. The storing means includes a back-up capacitor connected in series with a protective resistor, the protective resistor being bypassed by a rectifier which passed therethrough a discharging current from the capacitor to the load element.

The specific structure of the invention will be understood when the detailed description is read in conjunction with the accompanying drawings in which.

Like numerals of reference designate corresponding parts in the views.

Figure 1:
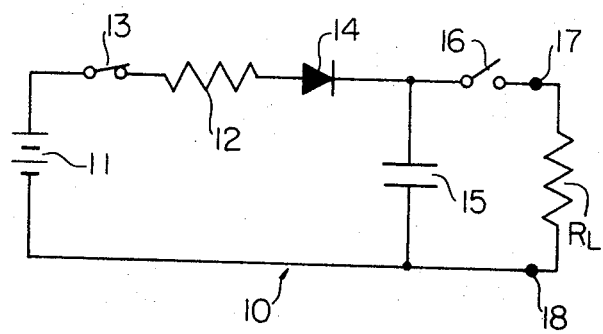
FIG. 1 is a circuit diagram of a conventional power supply system.

Referring now to the drawings and more specifically to FIG. 1, there is shown a conventional d-c power supply system generally indicated by a reference numeral 10, which includes a d-c power source 11, a protective resistor 12 having one terminal connected through a key switch 13 to a positive terminal of the power source 11, a rectifier or diode 14 having an anode connected to the other terminal of the protective resistor 12, and a back-up capacitor 15 having one terminal connected to a cathode of the diode 14 and the other terminal connected to the other terminal of the power source 11. The system preferably further comprises a energy supply switch 16 having one contact connected to the cathode of the diode 14. A pair of output terminals 17 and 18 are provided which are connected to the other contact of the switch 16 and the other terminal of the capacitor 15, respectively. A load element, in this case, a load resistor $R_L$ is connected across the output terminals 17 and 18.

When, in operation, the key switch 13 is first closed and, on the other hand, the energy supply switch 16 remains to open, a charging current flows from the positive terminal of the power source 11 through the key switch 13, the protective resistor 12, the diode 14 and the back-up capacitor 15 so that a certain amount of d-c energy is stored in the capacitor 15. The protective resistor 12 serves to suppress the charging current flowing through the capacitor to become so large as to destroy either the capacitor 15 or the power source 11. When, thereafter, the energy supply switch 16 is closed through a suitable actuator, the d-c power or energy from the power source 11 and the d-c energy stored in the back-up capacitor 15 is simultaneously supplied to the load resistor $R_L$. The diode 14 serves to prevent the discharge current of the capacitor 15 from flowing through the resistor 12 and the power source 11, reversely, when the power source 11 is broken. It is, in this instance, a problem that the power supply current through the resistor 12 causes unwanted energy loss or voltage drop to occur in the resistor 12 so that the conventional power supply system 10 is undesiredly inefficient in the power-supplying. Another problem is encountered in that since the back-up capacitor 15 should have a sufficiently large capacitor, the capacitor 15 is usually an electrolytic capacitor which has, however, poor durability and, accordingly, the power supply system has degraded reliability.

Figure 2:
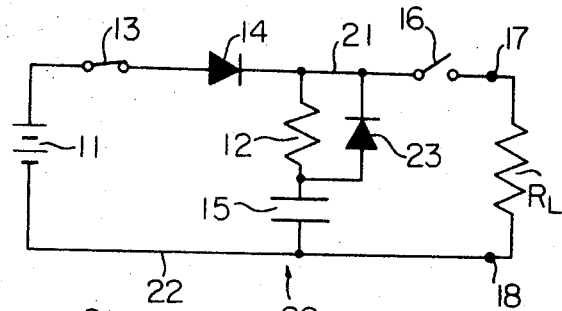
FIG. 2 is a circuit diagram of a d-c power supply system according to the invention.

In order to solve the above-stated problem encountered in the conventional power supply system, an improved d-c power supply system is provided according to the invention. FIG. 2 illustrates a d-c power supply system of the invention which is generally designated by numeral 20 and comprises a d-c power source 11, a rectifier or diode 14 having an anode connected through a key switch 13 to the positive terminal of the power source 11, a protective resistor 12 having one terminal connected through a positive bus line 21 to a cathode of the diode 14, and a back-up capacitor 15 having one terminal connected to the other terminal of the resistor 12 and the other terminal connected through a negative bus line 22 to the negative terminal of the power source 11. The protective resistor 12 is shunted by a rectifier or diode 23 which passes therethrough a discharge current from the capacitor 15. The power supply system 20 further comprises a energy supply switch 16 having one contact connected to the positive bus line 21 and a pair of output terminals 17 and 18 connected to the other contact of the switch 16 and the negative bus line 22, respectively. A load resistor $R_L$ is connected to the output terminals 17 and 18.

When, in operation, the key switch 13 is closed and, on the other hand, the supply switch 16 remains to open, a charge current flows from the positive terminal of the power source 11 through the key switch 13, the diode 14, the resistor 12 and the capacitor 15 to the negative terminal of the power source 11 so that an amount of d-c energy is stored in dependence on the capacity of capacitor 15. When, thereafter, the energy supply switch 16 is closed, the d-c energy stored in the capacitor 15 is supplied through the diode 21 and the output terminals 17 and 18 to the resistor $R_L$ and the d-c power source from the power source 11 is also supplied through the diode 14 to the resistor $R_L$. It is apparent from the above description that since most of the discharge current from the capacitor 15 flows through the diode 23, the energy stored in the capacitor 15 discharges through the load resistor $R_L$ without energy loss or voltage drop. Furthermore, the d-c energy from the power source is supplied only through the diode 14 to the resistor $R_L$ so that unwanted energy loss or voltage drop can be avoided.

Figure 3:
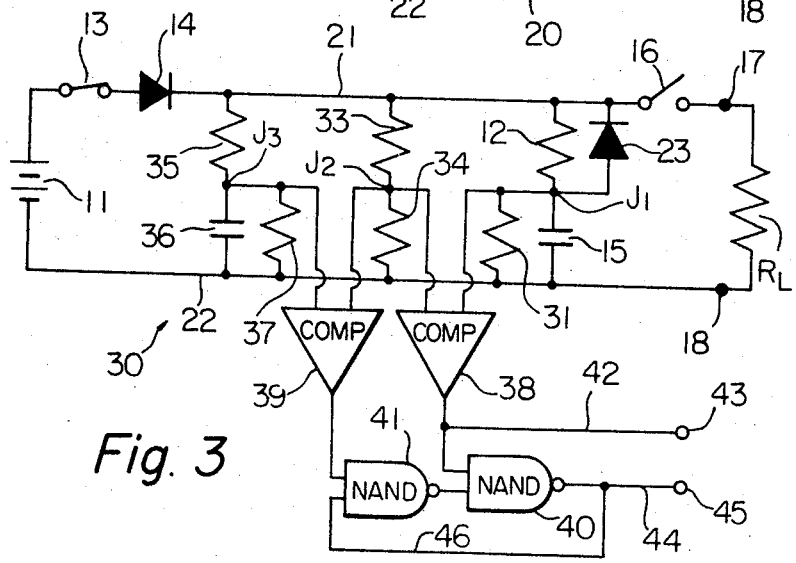
FIG. 3 is a circuit diagram of another power supply system according to the invention.

In FIG. 3, another d-c power supply system according to the invention is shown which is generally designated by reference numeral 30 and further comprises signal generator for producing an information signal representing the condition of the back-up capacitor in the system in addition to the same elements as the system of FIG. 2. This power supply system 30 comprises a d-c power source 11, a rectifier or diode 14 having an anode connected through a key switch 13 to the positive terminal of the power source 11, a first protective resistor 12 having one terminal connected through a positive bus line 21 to the cathode of the diode 14 and a back-up capacitor 15 having one terminal connected to the other terminal of the resistor 12 and the other terminal connected to a negative bus line 22 connected to the negative terminal of the power source 11. An electrolytic capacitor is usually used for the capacitor 15. The resistor 12 is shunted by a bypass diode 23 which allows to flow therethrough a discharge current from the capacitor 15. A pair of output terminals 17 and 18 are respectively connected through a energy supply switch 16 to the positive bus line 21 and to the negative bus line 22. A load resistor $R_L$ is interposed between the output terminals 17 and 18. A discharging resistor 31 is connected across a joint $J_1$ and the negative bus line 22 thereby to shunt the capacitor 15. The discharge resistor 31 has a relatively large resistor so as to slowly discharge the electric charges or energy stored in the capacitor 15. A voltage divider composed of resistors 33 and 34 is interposed between the positive and negative bus lines 21 and 22, which divider produces at a joint $J_2$ between the resistors 33 and 34 a reference voltage reduced from the voltage across the positive and negative bus lines 21 and 22. A series connection composed of a second protective resistor 35 and a reference charge-storing capacitor 36 interconnects between the positive and negative bus lines 21 and 22. A second discharging resistor 37 is connected across a joint $J_3$ between the resistor 35 and the capacitor 36 and the negative bus line 22 thereby to shunt the capacitor 36. The discharging resistor 37 has a relatively large resistor so that the resistor 37 slowly discharges an electric charge stored in the capacitor 36. The signal generator includes first and second comparators 38 and 39, and first and second NAND gates 40 and 41. The first comparator 38 has its input terminals connected to the joints $J_1$ and $J_2$ and its output terminal connected through a line 42 to a first output terminal 43 and to an input terminal of the first NAND gate 40. The first NAND gate 40 has its output terminal connected through a line 44 to a second output terminal 45. The second comparator 39 has its input terminals connected to the joints $J_2$ and $J_3$ and its output terminal connected to one input terminal of the second NAND gate 41. The other input terminal of the second NAND gate 41 is connected through a line 46 to the output terminal of the first NAND gate 40. Output terminal of the second NAND gate 41 is connected to the other input terminal of the first NAND gate 40.

With the above-stated arrangement, a certain amount of d-c electric energy is stored through the diode 14 and the resistor 12 in the back-up capacitor 15 when the key switch 13 is closed. When, thereafter, the energy supply switch 16 is closed, the energy stored in the capacitor 15 is delivered through the diode 23 and the switch 16 to the load resistor $R_L$. It is now apparent that the power supply system 30 supplies the d-c power of the power source 11 to the load resistor $R_L$ in the same manner as the system of FIG. 2. Upon the closure of the key switch 13, the reference voltage appears at the joint $J_2$, which is delivered to input terminals of the first and second comparators 38 and 39. Each of the comparators 38 and 39 is adapted to produce a logic "1" signal at its output terminal when an input voltage applied to the remaining input terminal thereof exceeds the reference voltage. The capacitor 36 is, on the other hand, charged by a charge current through the resistor 35 so that an exponentially increasing voltage appears at the joint $J_3$. The signal generator produces the information signals by comparing the potentials or voltages at the joints $J_1$, $J_2$ and $J_3$.

The operation of the signal generator will be described hereinbelow.

When the key switch 13 is closed and the energy supply switch 16 is remained to open, the potentials at the joints $J_1$ and $J_2$ exponentially increases from zero potential since the capacitors 15 and 36 are completely discharged through the resistors 31 and 37 before the closure of the key switch 13. It is, in this instance, to be noted that the time constant of the resistor 35 and the capacitor 36 is so selected that the potential at the joint $J_3$ earlier than the potential at the joint $J_1$ as long as the capacitor 15 maintains normal condition. When, on the other hand, the potentials at the joints $J_1$ and $J_3$ is lower than that at the joint $J_2$, the comparators 38 and 39 respectively produces logic "0" signals at the output terminals thereof, so that, the first and second NAND gates produce logic "1" signals, respectively.

When the back-up capacitor 15 maintains normal condition, the potential at the joint $J_3$ exceeds the reference potential at the joint $J_2$ earlier than the potential at the joint $J_1$ with the result that a logic "1" signal appears at the output terminal of the second comparator 39 while a logic "0" signal resides on the output terminal of the first comparator 38, whereby a logic "1" signal apperas at the output terminal of the second NAND gate 41 and accordingly a logic "1" signal apperas on the output terminal of the first NAND gate 40. The logic "1" signal on the output terminal of the first NAND gate 40 is held, even if the first comparator 38 produces a logic "1" signal on its output terminal upon the expiration of a certain time period from the time when the second comparator 39 produces the logic "1" signal. It is now apparent from the above description that logic "1" signal continuously appears at the output terminal 45 as long as the back-up capacitor 15 maintains its normal condition.

When, on the contrary, the back-up capacitor 15 has a degraded or decreased capacitance, the potential at the joint $J_1$ exceeds the reference potential at the joint $J_2$ earlier than the potential at the joint $J_3$. The first comparator 38 then produces a logic "1" signal on its output terminal earlier than the second comparator 39 whereby the first NAND gate 40 produces a logic "0 27 signal at its output terminal since the second NAND gate 41 still produces the logic "1" signal. Thereafter, even if, the potential at the joint $J_3$ exceeds the potential at the joint $J_2$ and the comparator 39 produces a logic "1" signal, the second NAND gate 41 continues to produce the logic "1" signal since the logic "0" signal on the output terminal of the first NAND gate 40 is applied to the other input terminal of the second NAND gate 41. It is now apparent that the output signal from the output terminal 45 is held logic "0" when the back-up capacitor 15 has a degraded capacitor.

When the back-up capacitor 15 is completely or substantially short-circuited, the potential at the joint $J_1$ remains zero even if the key switch 13 is closed. Accordingly, the first comparator 38 continues to produce a logic "0" signal which is delivered through the line 42 to the output terminal 43.

The output signals appearing on the output terminals 43 and 45 as above-stated are picked up by a suitable device which informs the operator of deterioration or breakage of the back-up capacitor 15. When the capacitor 15 deteriorates as above, the capacitor 15 is replaced by new one. It may be possible to adopt the redundant system in which a plurality of electrolytic capacitors connected in parallel with one another are used for the back-up capacitor 15. However, such redundant system is, in this case, not so efficient because the electrolytic capacitor has so low reliability.

It should be now noted that the resistor 35 can have a relatively large resistance since the voltage drop or energy loss in the resistor 35 is apparently not a problem. Since, therefore, it is unnecessary to use as the capacitor 36 a capacitor having such a large capacitor as an electrolytic capacitor, a capacitor having a small capacitance can be used, which is highly reliable. It is well known that the capacitor other than the electrolytic capacitor usually has 20 times as large reliability as the electrolytic capacitor.

It should be appreciated that the power supply system of the invention is especially useful for a safety device of the motor vehicle such as the airbag system including a inflatable protector bag. The safety device is mounted on the motor vehicle for the purpose of protecting the occupant of the vehicle from incurring a serious injury in the event of a collision or rapid deceleration of the motor vehicle when cruising. The protector bag serves as a restraint of the occupant of the vehicle so that the forward or otherwise directed momentum of the occupant of the vehicle is substantially absorbed or dampened during the collision condition. The invention power supply system can preferably be used for the power source of the actuator of such safety device as above. Even if the battery of the motor vehicle is destroyed or electric connectors interconnecting between the battery and the actuator is cut or disconnected from the battery due to shocks or vibrations or physical breakage caused by the collision, the electric energy stored in the back-up capacitor sufficiently energizes the actuator of the safety device.

It should be apparent from the above detailed description that an improved power supply system has been provided. The described system is efficient, simple and reliable.

It will be understood that the invention is not to be limited to the exact construction shown and described and that various changes and modifications may be made without departing from the spirit and scope of the invention, as defined in the appended claims.

What is claimed is:

1. An electric power supply system comprising:
   a d-c power source;
   a first rectifier serially connected to said power source so as to permit a current to flow through said power source in only one direction from the negative to positive terminals of said power source;
   a pair of output terminals connected across said rectifier and said power source, said output terminals being connected to a load;
   a first series connection composed of a first protective resistor and a back-up capacitor, connected across said output terminals, said resistor being bypassed by a second rectifier so that a discharge current from said capacitor flows through said second rectifier;
   a first discharging resistor bypassing said back-up capacitor so as to slowly discharge said back-up capacitor;
   a second series connection composed of a second protective resistor and a reference charge-storing capacitor, connected across said first rectifier and said power source, said reference charge-storing capacitor being bypassed by a second discharging resistor;
   a voltage divider composed of first and second voltage dividing resistors, connected acrosss said first rectifier and power source so as to produce a reference voltage;
   a first comparator for producing a logic "1" signal when a voltage across said back-up capacitor exceeds said reference voltage;
   a second comparator for producing a logic "1" signal when a voltage across said reference charge-storing capacitor; and
   means for producing information signals representing condition of said back-up capacitor in dependence on said logic "1" signals from said first and second comparators.

2. An electric power supply system as claimed in claim 1, in which said means includes a first output terminal connected to the output terminal of said first comparator, a second output terminal, a first NAND gate having an output terminal connected to said second output terminal and one input terminal connected to said output terminal of the first comparator, a second NAND gate having an output terminal connected to the other input terminal of said first NAND gate, one input terminal connected to the output terminal of said second comparator and the other input terminal connected to said output terminal of the first NAND gate.

* * * * *